United States Patent [19]
Sakai et al.

[11] Patent Number: 6,047,052
[45] Date of Patent: Apr. 4, 2000

[54] DATA COLLECTION METHOD AND SYSTEM WITH SHORTER CONTROL INTERVAL

[75] Inventors: Kazuo Sakai; Katsumi Kishida; Tomoki Watanabe; Kouichi Maruyama, all of Tokyo, Japan

[73] Assignee: Nippon Telegraph and Telephone Corporation, Japan

[21] Appl. No.: 09/126,638

[22] Filed: Jul. 30, 1998

[30] Foreign Application Priority Data

Jul. 30, 1997 [JP] Japan .................................. 9-205061
Sep. 22, 1997 [JP] Japan .................................. 9-257238

[51] Int. Cl.[7] .................................................. H04M 15/00
[52] U.S. Cl. .......................... 379/133; 379/113; 379/134; 379/92.01; 379/92.04
[58] Field of Search ..................... 379/113, 111, 379/112, 133, 134, 92.01, 92.02, 92.03, 92.04, 106.01, 90.01; 348/1

[56] References Cited

U.S. PATENT DOCUMENTS

| | | | |
|---|---|---|---|
| 5,436,961 | 7/1995 | Kobayashi | 379/201 |
| 5,469,503 | 11/1995 | Butensky et al. | 379/265 |
| 5,805,681 | 9/1998 | Srikant et al. | 379/133 |
| 5,828,729 | 10/1998 | Clermont et al. | 379/133 |
| 5,859,899 | 1/1999 | Sakai et al. | 379/113 |
| 5,862,204 | 1/1999 | Kim et al. | 379/113 |
| 5,864,616 | 1/1999 | Hartmeier | 379/113 |
| 5,903,635 | 5/1999 | Kaplan | 379/113 |
| 5,923,742 | 7/1999 | Kodialam et al. | 379/113 |
| 5,926,530 | 7/1999 | Schlossman et al. | 379/113 |
| 5,940,480 | 8/1999 | Jeon et al. | 379/133 |
| 5,974,126 | 10/1999 | Hollas et al. | 379/133 |

FOREIGN PATENT DOCUMENTS 8-139806  5/1996  Japan .

*Primary Examiner*—Paul Loomis
*Assistant Examiner*—Rexford N Barnie
*Attorney, Agent, or Firm*—Pennie & Edmonds LLP

[57] ABSTRACT

A data collection method and system is provided, by which blank time due to a time lag is not generated and a call probability to be broadcast can be calculated based on the number of potentially calling terminals which was counted as recently as possible. In the method, the center broadcasts to terminals a call probability and a control ID number which is increased by one for each broadcast. Each terminal calls up the center based on the received probability value, and if calling up, the terminal informs the center of terminal data and the received ID number. The center manages the probability value and the number of received calls for each ID.

28 Claims, 13 Drawing Sheets

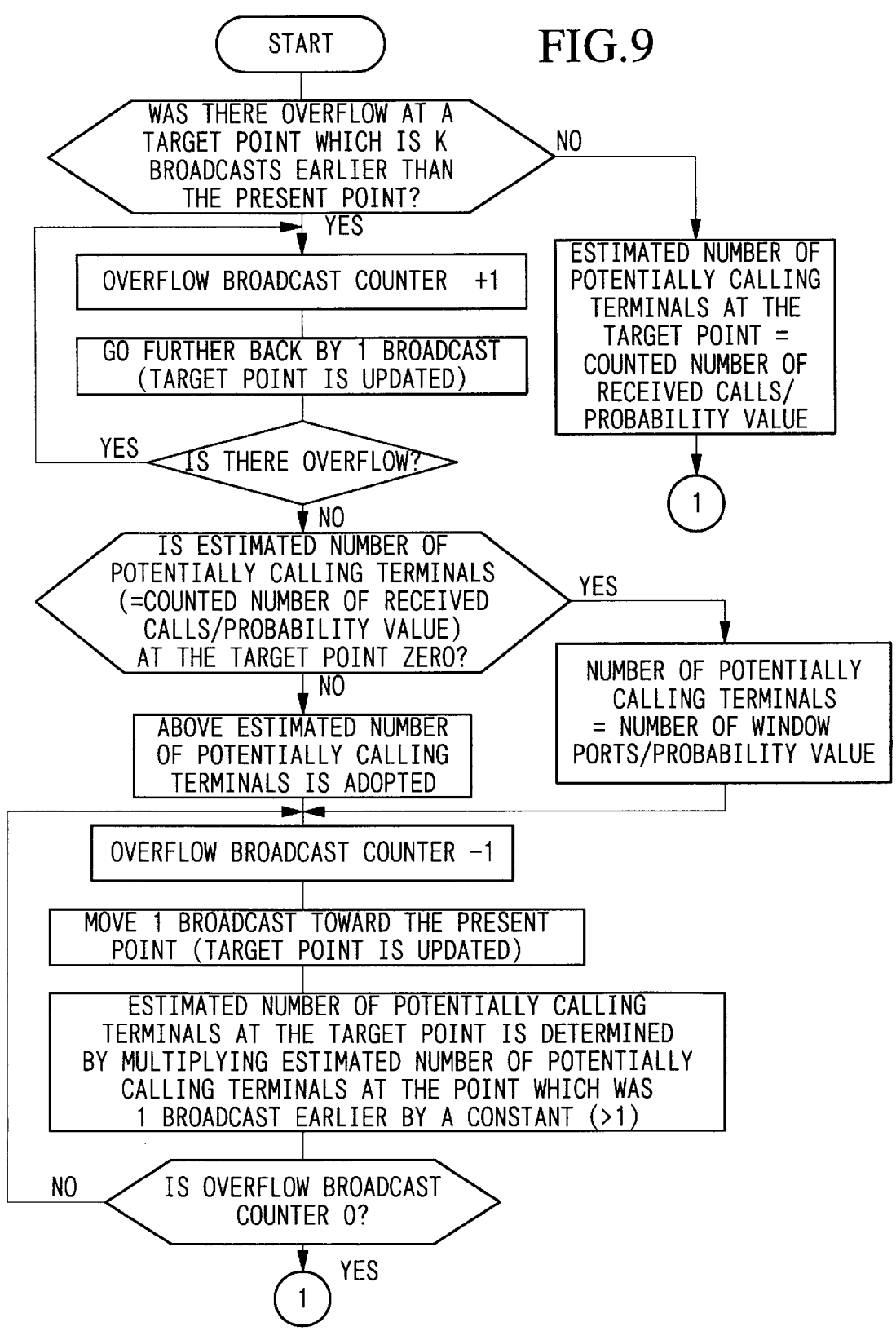

DATA COLLECTION METHOD AND SYSTEM WITH SHORTER CONTROL INTERVAL

BACKGROUND OF THE INVENTION

1. Field of the Invention

The present invention relates to a data collection method and system, relevant center and terminal apparatuses, and a storage medium storing a data collection program and, in particular, to a method and system for efficiently collecting data stored by a large number of unspecified terminals via a public network.

This application is based on Patent Applications Nos. Hei 9-205061 and Hei 9-257238 filed in Japan, the contents of which are incorporated herein by reference.

2. Description of the Related Art

Recently, telecast digitalization is proceeding, and in CS (Communication Satellite) broadcasts, a service on a digital system has already been started. Also in BS (Broadcasting Satellite) broadcasts and broadcasts using ground waves, the start of digitized broadcast services is scheduled. As expected services for such digital broadcasts, a multi-channel broadcast and a two-way interactive communication service have been proposed.

For the conventional national telecast on an analog system in Japan, a data broadcasting method was authorized about two years ago. This broadcasting method itself is similar to the method of the teletext or the caption broadcast, which has been used for 10 years or more. In addition, this data broadcasting method is expected to function as a pilot for the above-mentioned interactive communication service, and each TV station has started their own original service, for example, the "Bitcast" offered by the TBS and Fuji TV stations.

The telephone network is used as a device for collecting data from viewers and supplying it to the broadcasting station in such an interactive communication service. In such a situation, if a great number of viewers are going to send data all together, many problems may occur depending on the amount of the traffic of collected data, for example, congestion of the center window and/or the telephone network. Accordingly, a technique for controlling the data collection is necessary.

Japanese patent application, first publication, No. Hei 8-139806 ("METHOD AND SYSTEM FOR DATA COLLECTION") is an example of conventional data collection controlling techniques. In this system, when a probability value as control information is broadcast (i.e., widely sent) from the center, terminals receive the probability value and the terminals call up the center according to the probability designated by the above probability value.

FIG. 14 is a diagram for explaining a conventional method.

In this figure, when probability value $P_0$ is broadcast from a broadcasting station, each of many terminals generates a random number and terminals generating a random number which does not exceed the probability value $P_0$ call up the center. The center counts the number of calls received from the terminals and estimates the number of potentially calling terminals (that is, terminals which desires to call but have not performed yet) based on the above probability value and the counted number of received calls, and then determines and broadcasts a new probability value $P_1$.

As described above, the center accepts calls from terminals and receives data from the terminals, and simultaneously, counts the number of received calls. The center then estimates the number of all remaining potentially-calling terminals, based on the number of calls after counting and on the already-broadcast probability value. The center determines a probability value to be broadcast next, based on a ratio of the estimated number of potentially calling terminals to the number of possible arrival ports of the center, and broadcasts the new probability value.

The conventional method has a problem in which if a time lag from the broadcast of the control information (from the center) to the arrival of a response call (to the center) is larger than a time from connection to disconnection of a terminal to the center (that is, a service period), then data cannot be efficiently collected. That is, if control information is sent after counting of received calls is completed, then a time period of no call (see shaded areas in FIG. 15) appears before the arrival of the next wave of responsive calls, and thus the center window becomes idle during this time period. Therefore, efficient data collection cannot be performed.

SUMMARY OF THE INVENTION

In consideration of the above circumstances, an object of the present invention is to provide a data collection method and system, relevant center and terminal apparatuses, and a storage medium storing a data collection program, by which blank time due to a time lag is not generated and a call probability to be broadcast can be calculated based on the number of potentially calling terminals which was counted as recently as possible.

In order to realize the above object, the present invention provides a basic data collection method for collecting at a center data stored in many terminals via a public network wherein:

the center periodically broadcasts a probability value as control information from the center to each terminal at a predetermined interval, and stores the broadcast probability value;

each terminal receives the probability value, determines whether a calling operation is to be performed in response to the present broadcast based on a probability which is set according to the probability value, and if the operation is to be performed, the terminal sends terminal data to the center;

the center receives a call from the terminal which performed the calling operation, receives the terminal data corresponding to the call, counts the number of received calls for each broadcast control information based on the predetermined interval, and stores the counted number of received calls; and the center estimates the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used, and the center calculates and broadcasts a probability value to be broadcast next based on the estimated number of potentially calling terminals, wherein the predetermined interval of the broadcast of the probability value is set to be shorter than a period from the time of broadcasting the probability value to the time of receiving response calls from the terminals with respect to the relevant probability value.

According to this method, the predetermined interval for broadcasting the probability value can be suitably set with reference to past statistical data or the like, and thereby it is possible to realize a system by which blank time due to a time lag is not generated and a call probability to be broadcast can be calculated based on the number of potentially calling terminals which was counted as recently as possible.

If it is difficult to suitably set the predetermined interval, or a more accurate control is desired, then the following method is effective wherein:

as the control information periodically broadcast from the center to each terminal, an ID number is also broadcast as a serial number which corresponds to the control information for each broadcast, and the probability value and the corresponding ID number are stored in the center in a correspondence relationship;

each terminal receives the probability value and the ID number, and if the calling operation is performed, the terminal also sends the received ID number with the terminal data;

the center counts the number of received calls for each ID number and stores the counted number of received calls in a correspondence relationship with the relevant ID after the counting; and the center estimates the number of potentially calling terminals at the present time by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used.

According to this method, by using past broadcast information of the ID, it is possible to realize a system by which blank time is not generated and a call probability to be broadcast can be calculated based on the newest number of potentially calling terminals.

In detail, the following effects can be obtained.

A necessary time in which each terminal (including a modem and a relevant line) determines and performs a calling operation and is connected to the center has individual variation according to the kind of line (pulse or tone type, or, being contained in a PBX or being connected directly with a public network). According to dispersion of a delay amount relating to data output due to the above individual variation, an undesirable situation may happen in which in a counting operation of the number of received calls, a responsive call corresponding to a probability value is counted as a responsive call for another probability value. Such an undesirable situation can be prevented by using the above ID number.

If the frequency of broadcasting the call probability is increased, for example, by N times, then each call probability becomes 1/N times and thus the number of samples (i.e., responsive calls) also becomes 1/N times, and thereby the amount of data output has no uniform distribution and the number of potentially calling terminals may be erroneously estimated. Such possibility can be prevented using the ID number.

In the method in which an ID number is used, the following method is desirable in which regarding a target ID number which was broadcast k broadcasts earlier than the present ID number, if the counted number of received calls equals or exceeds the number of possible window ports of the center for accepting calls and thus an overflow occurs, then the number of continuous overflow broadcasts in which the window ports similarly overflowed is counted by going further back from the target ID number, and the larger the number of continuous overflow broadcasts, the larger the number of potentially calling terminals at the time of broadcasting the ID number which was broadcast k broadcasts earlier than the present ID number is estimated.

In this case, if the window overflow continuously happens for plural IDs, the estimated number of potentially calling terminals is increased according to the number of continuous overflow broadcasts and the call probability to be broadcast is decreased; thus, it is possible to quickly follow a rapid increase of the number of potentially calling terminals. Such a method is remarkably and especially effective for a shorter broadcast interval.

The following method is also desirable in which regarding plural ID numbers for which counting of the number of received calls has been completed, the number of potentially calling terminals at the present time is calculated for each ID number as a starting point, and an average of calculated results is determined as the estimated number of potentially calling terminals at the present time.

In this case, statistical dispersion due to a small number of received calls can be suppressed; thus, it is possible to suppress influence of an incidental variation of the number of potentially calling terminals and to perform accurate control to which a tendency of actual increase/decrease of the number of potentially calling terminals is reflected.

The following method is also desirable in which regarding plural ID numbers for which counting of the number of received calls has been completed, the number of potentially calling terminals at the present time is calculated for each ID number as a starting point, and the estimated number of potentially calling terminals at the present time is determined by performing an extensive interpolation with respect to the above calculated numbers of potentially calling terminals.

In this case, it is possible to accurately estimate the number of potentially calling terminals at the present time according to a temporal variation of the past numbers of potentially calling terminals.

The present invention also provides, as an apparatus corresponding to the above basic method, a data collection system for collecting at a center data stored in many terminals via a public network wherein the apparatus of the center comprises:

broadcasting means for periodically broadcasting a probability value as control information from the center to each terminal at a predetermined interval;

probability value storing means for storing the broadcast probability value;

receiving means for receiving a call from the terminal which performed the calling operation and also receiving the terminal data corresponding to the call;

counting means for counting the number of received calls for each broadcast control information based on the predetermined interval;

counted number storing means for storing the counted number of received calls;

estimation means for estimating the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used; and calculating means for calculating a probability value to be broadcast next based on the estimated number of potentially calling terminals, and each device of the terminal side comprises:

receiving means for receiving the probability value broadcast from the center;

calling determining means for determining whether a calling operation is to be performed in response to the present broadcast based on a probability which is set according to the probability value; and calling means for sending terminal data to the center if the operation is to be performed, and wherein the predetermined interval of the broadcast of the probability value is set to be shorter than a period from the time of broadcasting the probability value to the time of receiving response calls from the terminals with respect to the relevant probability value.

In the case of using the above-described ID number, the apparatus is further specified in that in the apparatus of the center:

the broadcasting means also broadcasts an ID number as a serial number which corresponds to the control information for each broadcast;

the probability value storing means stores the probability value and the corresponding ID number in a correspondence relationship;

the counting means counts the number of received calls for each ID number;

the counted number storing means stores the counted number of received calls in a correspondence relationship with the relevant ID; and the estimation means estimates the number of potentially calling terminals at the present time by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used, and in the device of the terminal:

the receiving means receives the probability value and the ID number broadcast from the center; and the calling means also sends the received ID number with the terminal data if the calling operation is performed.

The present invention also provides a center apparatus for performing the above basic method, and a center apparatus and a terminal device for performing the above-mentioned method using the ID number.

The present invention further provides computer readable storage media for a center apparatus, which respectively store a data collecting program including processes for executing the above basic method and a data collecting program including processes for executing the method using the ID number.

BRIEF DESCRIPTION OF THE DRAWINGS

FIG. 9 is a flowchart showing operations of estimating the number of potentially calling terminals for an ID as the starting point at the time of broadcasting the ID when the window ports fill up with responsive calls for the ID.

DESCRIPTION OF THE PREFERRED EMBODIMENTS

The basic concept of the present invention is to accurately estimate the number of potentially calling terminals; to calculate "the number of center window ports (which indicates system capacity)/ the number of potentially calling terminals" as a call probability value to be broadcast next; and to always maintain a number of received calls which just corresponds to the system capacity, and thereby to realize both of improvement of efficiency of data collection and suppression of (line) busy state (and thus prevention of network congestion).

Accordingly, it is desirable that the number of potentially calling terminals be detected as accurately as possible, and thus an ID number is desirably used with the probability value.

Figure 1:
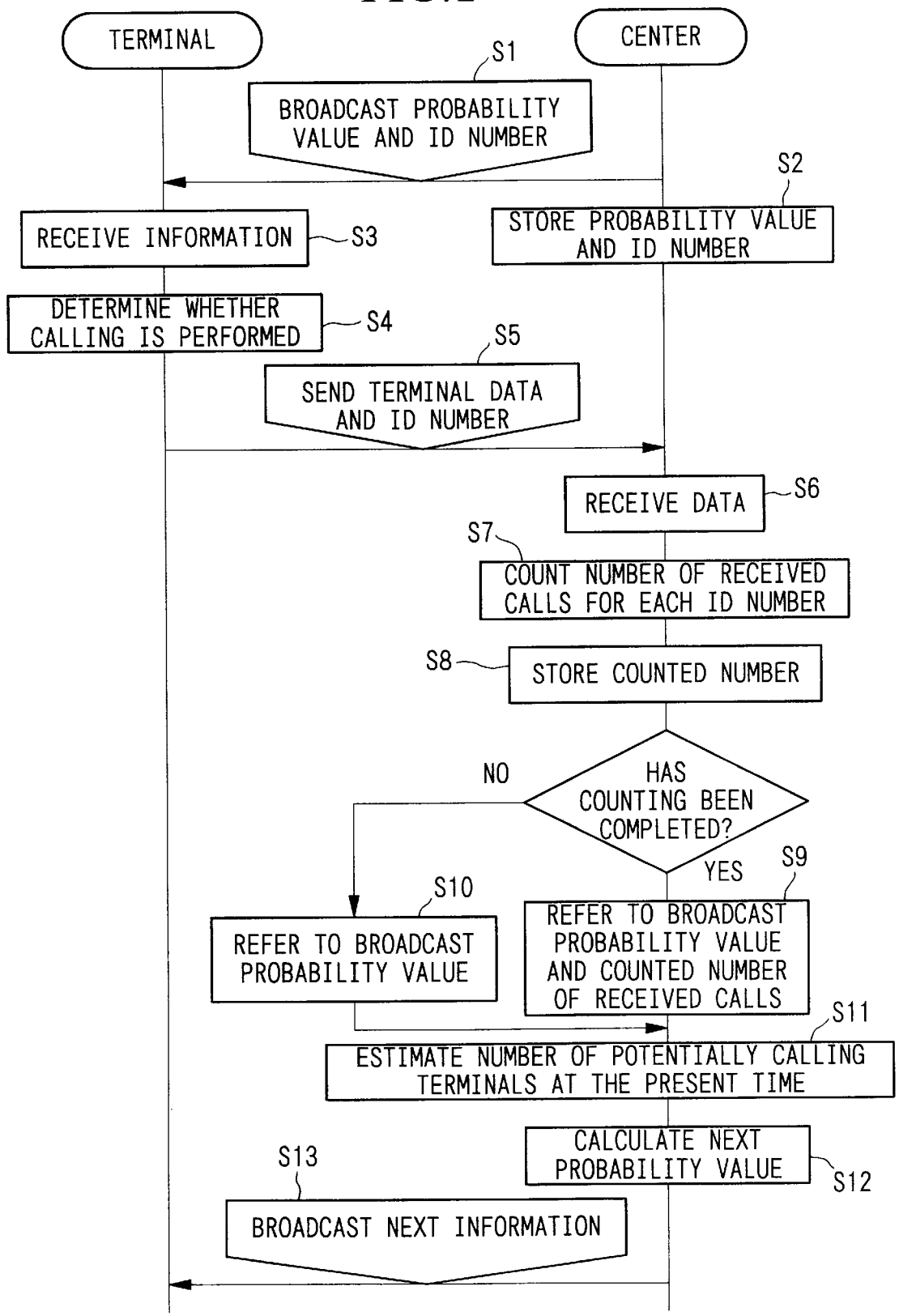
FIG. 1 is a diagram for explaining a typical method of the present invention.

FIG. 1 is a diagram for explaining the principle of a method using the ID number.

In FIG. 1, as control information periodically sent from the center to terminals, a probability value and an ID number, a serial number which corresponds to control information for each broadcast, are sent (see step S1), and the above probability value and ID number are stored in the center in a correspondence relationship (see step S2). Each terminal receives the above probability value and ID number (see step S3), and judges whether or not it calls, based on a probability determined according to the received probability value (see step S4). If it was judged that calling is to be carried out, terminal data and the received ID number are sent to the center (see step S5). The center accepts each call from a terminal and receives terminal data corresponding to the relevant call (see step S6) and counts the number of received calls for each ID number (see step S7). After the counting, the center stores the counted number of received calls in a correspondence relationship with the relevant ID number (see step S8). The center refers to and uses the broadcast probability value and the counted number of received calls regarding the ID number for which the counting was completed (see step S9), and uses only the broadcast probability value regarding the ID number for which the counting has not yet completed (see step S10), so as to estimate the number of potentially calling terminals at the present time by using at least a portion of the information relating to these ID numbers (see step S11). The center then calculates a probability value to be broadcast next based on the estimated number of potentially calling terminals (see step S12) and broadcasts the next information (see step S13).

Figure 2:
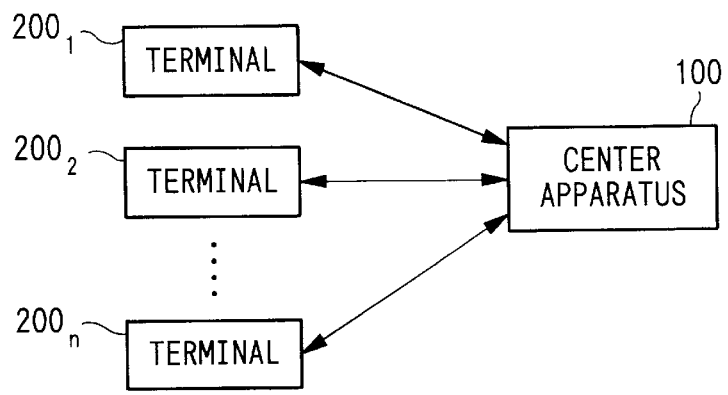
FIG. 2 shows a construction of a data collection system as an embodiment according to the present invention.
Figure 3:
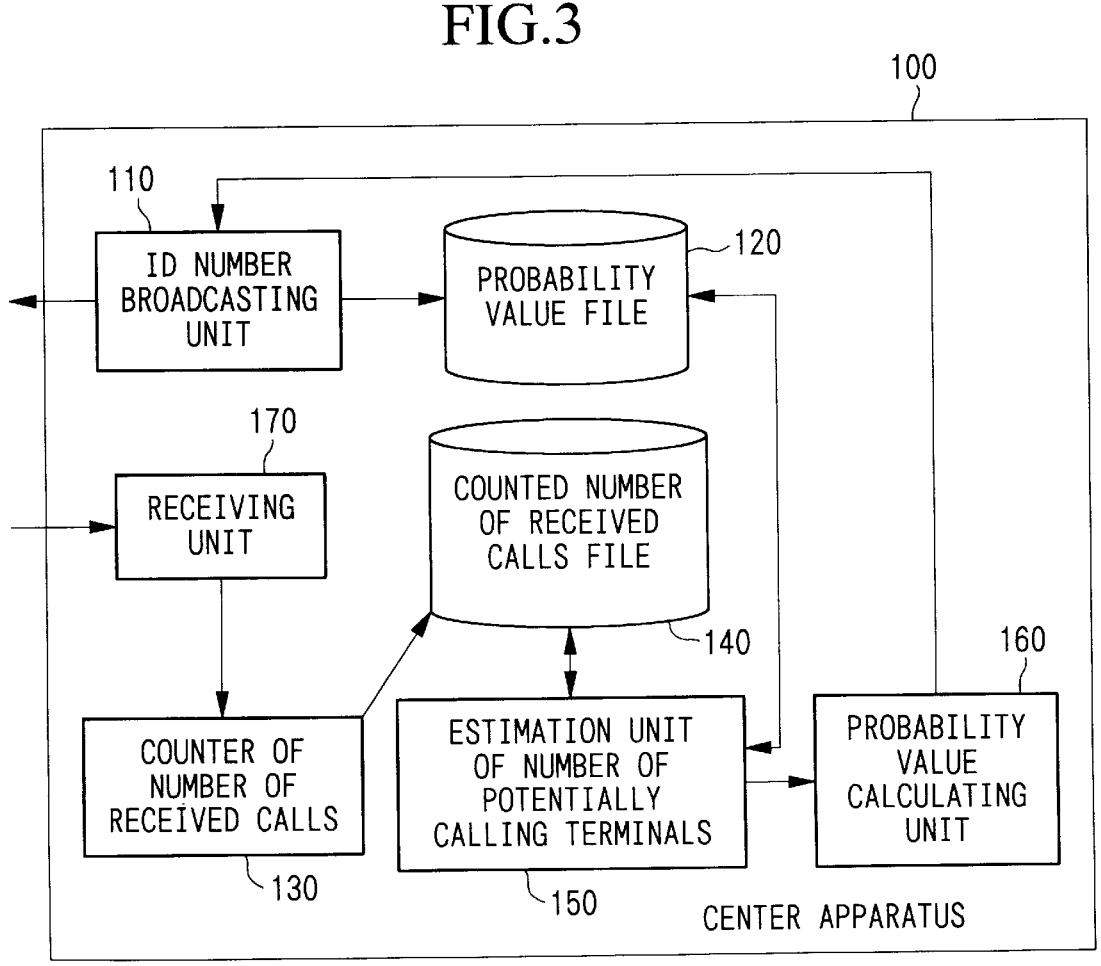
FIG. 3 shows the internal structure of the center apparatus in the data collection system in the embodiment.

FIG. 2 shows a construction of a data collection system as an embodiment according to the present invention. FIG. 3 shows the internal structure of the center apparatus in the data collection system.

The center (apparatus) 100 as shown in FIG. 3 comprises ID number broadcasting unit 110, probability value file 120, counter 130 of the number of received calls, counted number of received calls file 140, estimation unit 150 of the number of potentially calling terminals, probability value calculating unit 160, and receiving unit 170.

The ID number broadcasting unit 110 broadcasts, as periodically broadcast control information, probability values, calculated by and output from the probability value calculating unit 160 in turn, and serial ID numbers in a correspondence relationship with the control information for each broadcast (that is, the ID numbers respectively correspond to each probability value). In addition, the ID number broadcasting unit 110 communicates a set of the probability value and the ID number for each broadcast to probability value file 120.

In the probability value file 120, data of the probability values broadcast by the ID number broadcasting unit 110 are stored in connection with the above ID numbers.

In more detail, this file is a management table, and with probability value P for an ID number, a corresponding value in the table becomes:

P_table[ID]=P

That is, regarding the ID number which is increased by one for each broadcast of a probability value, the relevant probability value is stored into element "P_table[ID]". The initial value for each element is zero.

The receiving unit 170 receives terminal data corresponding to a call from terminal (device) 200.

The counter 130 of the number of received calls counts the number of received calls for each ID with respect to the terminal data received by the receiving unit 170, and stores the counted number of received calls into the counted number of received calls file 140 in connection of the relevant ID.

Accordingly, in the counted number of received calls file 140, the number of received calls counted by the counter 130 is stored.

In more detail, this file is a management table, and with the number of received calls A with respect to an ID number, a corresponding value in the table becomes:

A_table[ID]=A

In the table, regarding the ID communicated from a terminal for each call, the value of element "A_table[ID]" is increased by one. The initial value of each element is zero.

The estimation unit 150 of the number of potentially calling terminals accesses probability value file 120 and counted number of received calls file 140, and estimates the number of potentially calling terminals at the present time. The estimation unit 150 then informs the probability value calculating unit 160 of the estimated result. That is, in the estimation of the number of potentially calling terminals at the present time (i.e., the present number of potentially calling terminals), the broadcast probability value and the counted number of received calls are used regarding the ID number for which the counting was completed while only the broadcast probability value is used regarding the ID number for which the counting has not yet completed, and thus the whole or a part of the information relating to each ID number is used for estimating the present number of potentially calling terminals.

The probability value calculating unit 160 calculates a probability value to be broadcast next to terminals 200, based on the number of potentially calling terminals received from the estimation unit 150 of the number of potentially calling terminals, and informs the ID number broadcasting unit 110 of a calculated result.

Figure 4:
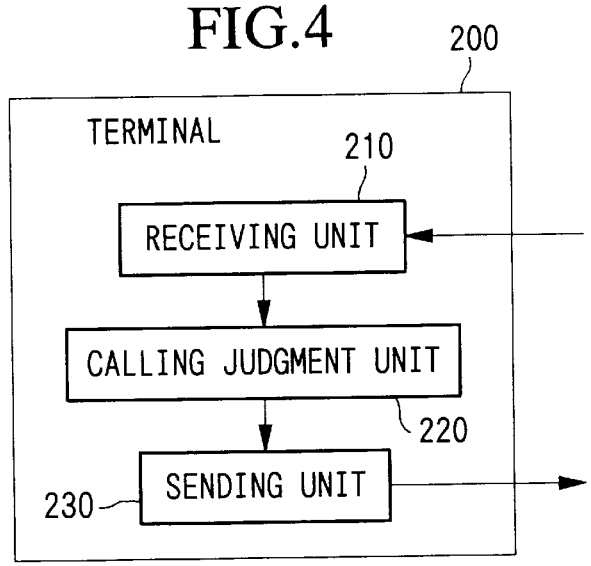
FIG. 4 shows a construction of each terminal in the data collection system in the embodiment.

FIG. 4 shows a construction of each terminal 200 in the data collection system.

In the figure, receiving unit 210 receives a probability value and an ID number sent from the center.

Calling judgment unit 220 determines whether calling is performed at the present turn, based on a probability designated according to the probability value received by the receiving unit 210.

When sending unit 230 is commanded by the calling judgment unit 220 to perform calling, the unit 230 sends terminal data and the above received ID number to the center 100.

Figure 5:
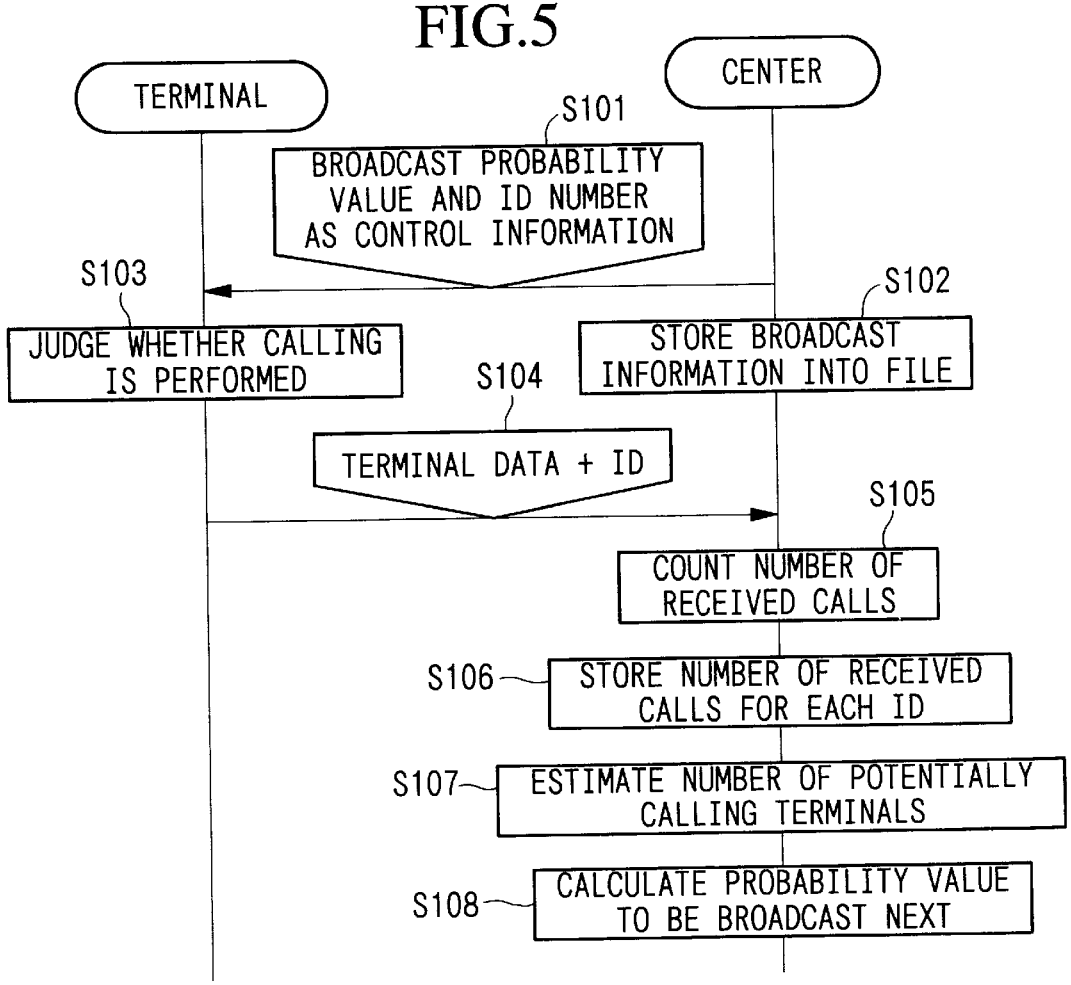
FIG. 5 is a sequence chart showing operations according to the data collection method in the embodiment.

Hereinbelow, a series of operations in the present embodiment will be explained with reference to the sequence chart in FIG. 5.

Step S101: The ID number broadcasting unit 110 in the center 100 broadcasts, as periodically broadcast control information to terminals 200, a probability value and a serial ID number which corresponds to the control information for each turn.

Step S102: The ID number broadcasting unit 110 then stores the probability value and ID number, broadcast to terminals 200, in a form of a correspondence relationship.

Step S103: The receiving unit 210 of each terminal 200 receives the probability value and the ID number from center 100. The calling judgment unit 220 generates a random number R from 0 to 1, receives the probability value P and the ID number from the receiving unit 210, and compares the random number R and probability value P. If the result of comparison is "R≦P", it is judged that calling be performed, while if the result is "R>P", it is judged that calling in response to this broadcast not be performed. When it is judged that calling be performed, the ID number and the result of judgment are communicated to sending unit 230.

Step S104: When calling is performed, sending unit 230 communicates terminal data and the received ID number to center 100.

Step S105: The receiving unit 170 of center 100 detects a call from terminal 200, and receives data sent from the terminal and extracts the ID number. The receiving unit 170 then communicates results of the above reception to counter 130 of number of received calls. After all relevant data are received, the receiving unit 170 disconnects the call.

Step S106: When the counter 130 of the number of received calls is informed of detection of a call (i.e., receives the above results), the counter 130 increases the value of relevant element "A_table[ID]", stored in the number of received calls file 140, by 1.

Step S107: The estimation unit 150 of the number of potentially calling terminals estimates the present number of potentially calling terminals by using the whole or a part of the information relating to each ID number in a manner such that the broadcast probability value and the counted number of received calls are used regarding the ID number for which the counting was completed while only the broadcast probability value is used regarding the ID number for which the counting has not yet completed. A practical example will be shown later.

Step S108: The probability value calculating unit 160 calculates a probability value to be nest broadcast based on the estimated number of potentially calling terminals. With the number of potentially calling terminals NT and the possible window ports NR of center 100, which is specified in the system, then probability value is determined as "Pn=NR/NT". In this way, the ID number broadcasting unit 110 broadcasts the calculated probability value to terminals 200.

With this broadcast of the probability value to the terminals 200, the center 100 also broadcasts an ID number for calling control, which is increased by one for each broadcast. Each terminal 200 calls up the center based on the received probability value. When the terminal 200 is connected to center 100, the terminal communicates the ID number for calling control to the center 100. The center 100 manages the call probability (value) and the relevant number of received calls for each ID.

The responsive calls from the terminals for each ID are not strictly received by center 100 at the same time. That is, due to an unexpected factor such as the structural difference between terminals 200 or the characteristics of a network used, or due to an intentional factor such as a control for generating time variance, the responsive calls reach the center with a temporal dispersive distribution. Strictly, the number of received calls for an ID cannot be accurately counted before the last call is detected. However, if a distribution relating to the variance of the received calls is previously known, an approximate number of received calls may be detected though the last call is not always awaited. By using such a known distribution, newer data can be used for performing more efficient data collection.

Figure 6:
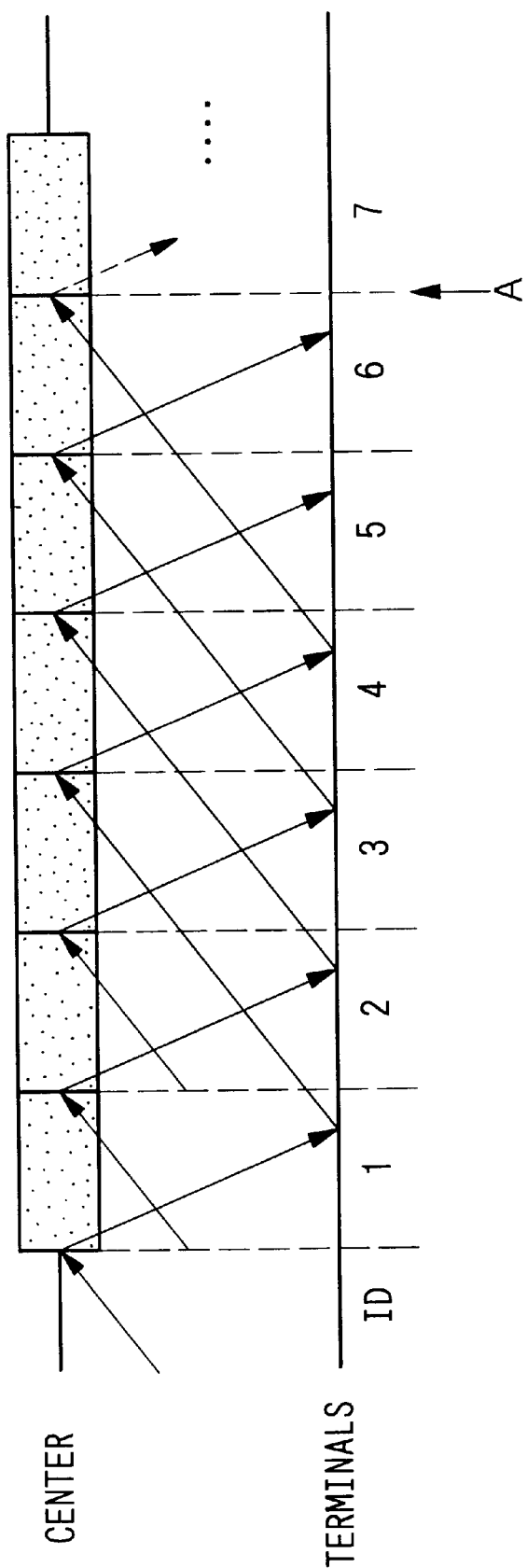
FIG. 6 is a diagram for explaining an example of calculation of the number of potentially calling terminals in the present embodiment.

FIG. 6 is a diagram for explaining an example of the calculation of the number of potentially calling terminals in the present embodiment.

Regarding an ID number for which counting of the number of received calls has been completed among all broadcast ID numbers, the estimation unit 150 in center 100 estimates the number of potentially calling terminals based on the call probability value and the number of received calls with respect to the ID number. This is just an estimated number of potentially calling terminals at the time of broadcasting the relevant ID. Regarding the IDs after this ID, amendment such as subtracting the number of already received calls and the number of expected received calls is performed so as to estimate the present number of potentially calling terminals.

In the example as shown in FIG. 6, at the time indicated by arrow A, information which can be used for calculating the call probability (value) for "ID=7" is (i) the broadcast call probability values and the corresponding numbers of received calls at ID=4 or less and (ii) the broadcast call probability values at ID=5 and ID=6. The present number of potentially calling terminals is estimated using these information items.

That is, regarding the ID for which the number of received calls has already been counted, the actual number of received calls for the ID is subtracted from the estimated number of potentially calling terminals at the time of broadcasting the ID so as to estimate the number of potentially calling terminals at the time of broadcasting the next ID. Regarding remaining broadcast IDs for which the number of received calls has not been counted yet, the number of received calls estimated by using the estimated number of potentially calling terminals at the time of broadcasting the ID and the call probability value broadcast with the ID is subtracted (from the number of potentially calling terminals) so as to estimate the number of potentially calling terminals for the next ID to the relevant ID. In this way, the number of potentially calling terminals at the present time, that is, at the time of broadcasting the present ID, is estimated. This is a method of estimating the present number of potentially calling terminals, using an ID (for which the number of received calls has already been counted) as a starting point.

Figure 7:
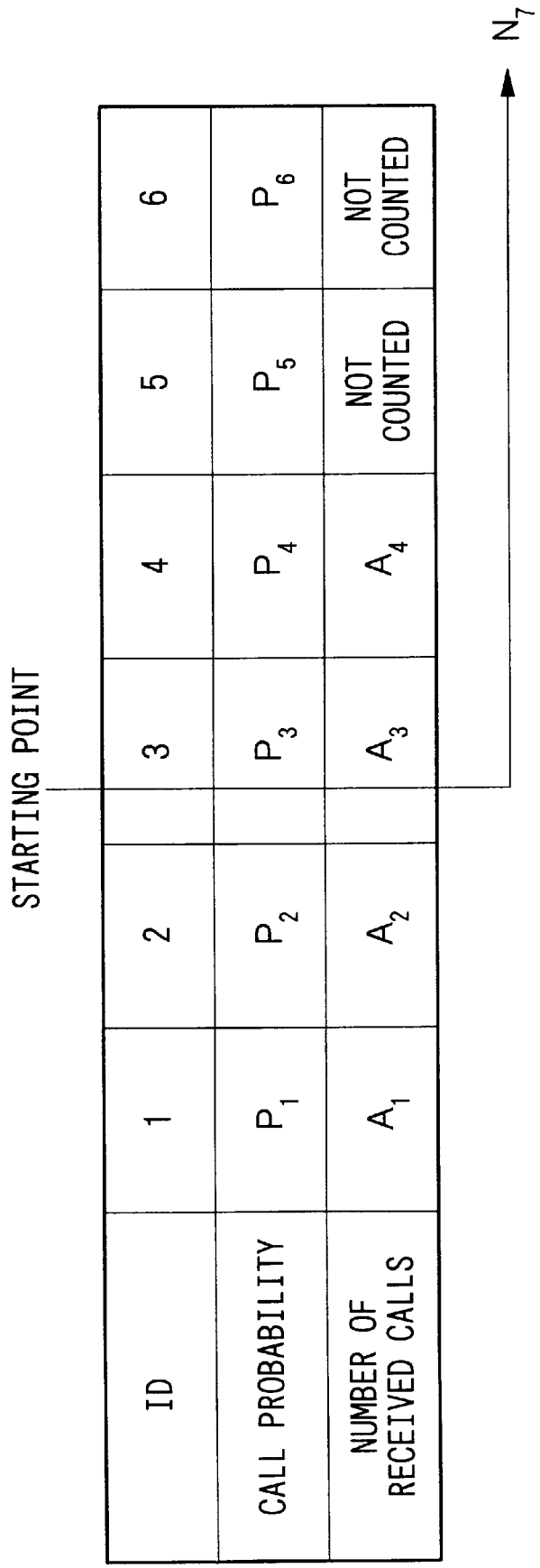
FIG. 7 is a diagram for explaining a method of estimating the number of potentially calling terminals at ID=7 in the present embodiment.

FIG. 7 is a diagram for explaining a method of estimating the number of potentially calling terminals at ID=7 in the present embodiment. In the example shown in this figure, estimation is performed using a start point at ID=3.

The number of potentially calling terminals N is calculated as follows. For example, "$N_3$" means the number of potentially calling terminals at ID=3.

The estimation of the number of potentially calling terminals at ID=3 is:

$N_3 = A_3$ (number of received calls)/$P_3$ (call probability)

By subtracting the number of received calls relating to ID=3 from $N_3$, the number of potentially calling terminals at ID=4 is estimated as follows:

$$N_4 = \max(N_3 - A_3, 0)$$

Similarly, by subtracting the number of received calls relating to ID=4 from $N_4$, the number of potentially calling terminals at ID=5 is estimated as follows:

$$N_5 = \max(N_4 - A_4, 0)$$

Next, by subtracting the number of expectedly received calls relating to ID=5 from $N_5$ and also by using the number of possible window ports at the center side, the number of potentially calling terminals at ID=6 is estimated as follows:

$$N_6 = \max(N_5 - \min(N_5 \times P_5, \text{number of window ports}), 0)$$

Similarly, by subtracting the number of expectedly received calls relating to ID=6 from $N_6$, the number of potentially calling terminals at ID=7 is estimated as follows:

$$N_7 = \max(N_6 - \min(N_6 \times P_6, \text{number of window ports}), 0)$$

Figure 8A:
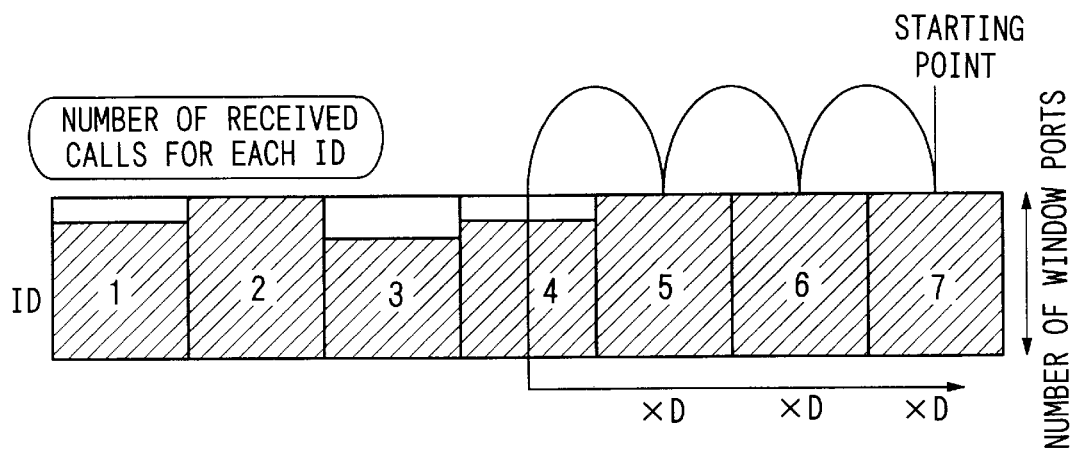
FIGS. 8A and 8B are diagrams for explaining a method of estimating the number of potentially calling terminals for an ID as the starting point at the time of broadcasting the ID when the window ports fill up with responsive calls for the ID, as an embodiment according to the present invention.
Figure 8B:
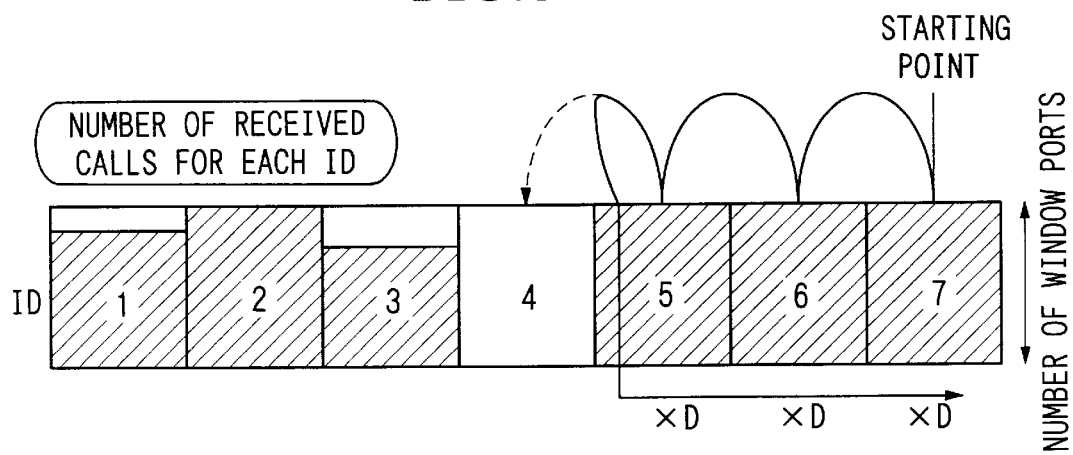

FIGS. 8A and 8B are diagrams for explaining a method of estimating the number of potentially calling terminals for an ID as the starting point at the time of broadcasting the ID when the window ports fill up with responsive calls for the ID, as an embodiment according to the present invention. FIG. 8A shows an example in which the number of terminals, which was estimated for an ID for which the window ports did not fill up with the responsive calls, is not zero, while FIG. 8B shows an example in which the number of terminals, which was also estimated for an ID for which the window ports did not fill up with the responsive calls, is zero. In the figures, numerals 1–7 indicate each ID, and shaded parts illustratively show the number of calls received at the window relating to each ID.

Furthermore, FIG. 9 is a flowchart showing operations for performing the above estimation method. Hereinafter, the method will be explained with reference to these figures.

If the number of received calls for an ID as the starting point reaches the number of possible window ports (i.e., an overflow state), the number of continuous broadcasts having such an overflow state is counted in a direction going back from the ID as the starting point, and an estimated number of potentially calling terminals at the time of broadcasting an ID of a non-overflow state is calculated.

In FIG. 8A, the number of potentially calling terminals estimated as explained above is larger than zero; thus, this estimated number of potentially calling terminals is multiplied by a constant D (>1) by the continuous overflow times (3 times in the example of FIG. 8A), so as to estimate the number of potentially calling terminals at the time of broadcasting the ID as the starting point.

In FIG. 8B, the estimated number of potentially calling terminals is zero as shown by the dotted arrow. In this case, even if this number of terminals is multiplied by a constant (>1) by any times, the product is always zero. Therefore, instead of this operation, the number of potentially calling terminals at the time of broadcasting the ID as the starting point is calculated by multiplying "the number of window ports/call probability" with respect to the first ID of the overflow state (that is, the next ID to the presently noticed ID for which the number of potentially calling terminals is zero) by a constant D (>1) by the continuous overflow times (also three times in this example).

Figure 10:
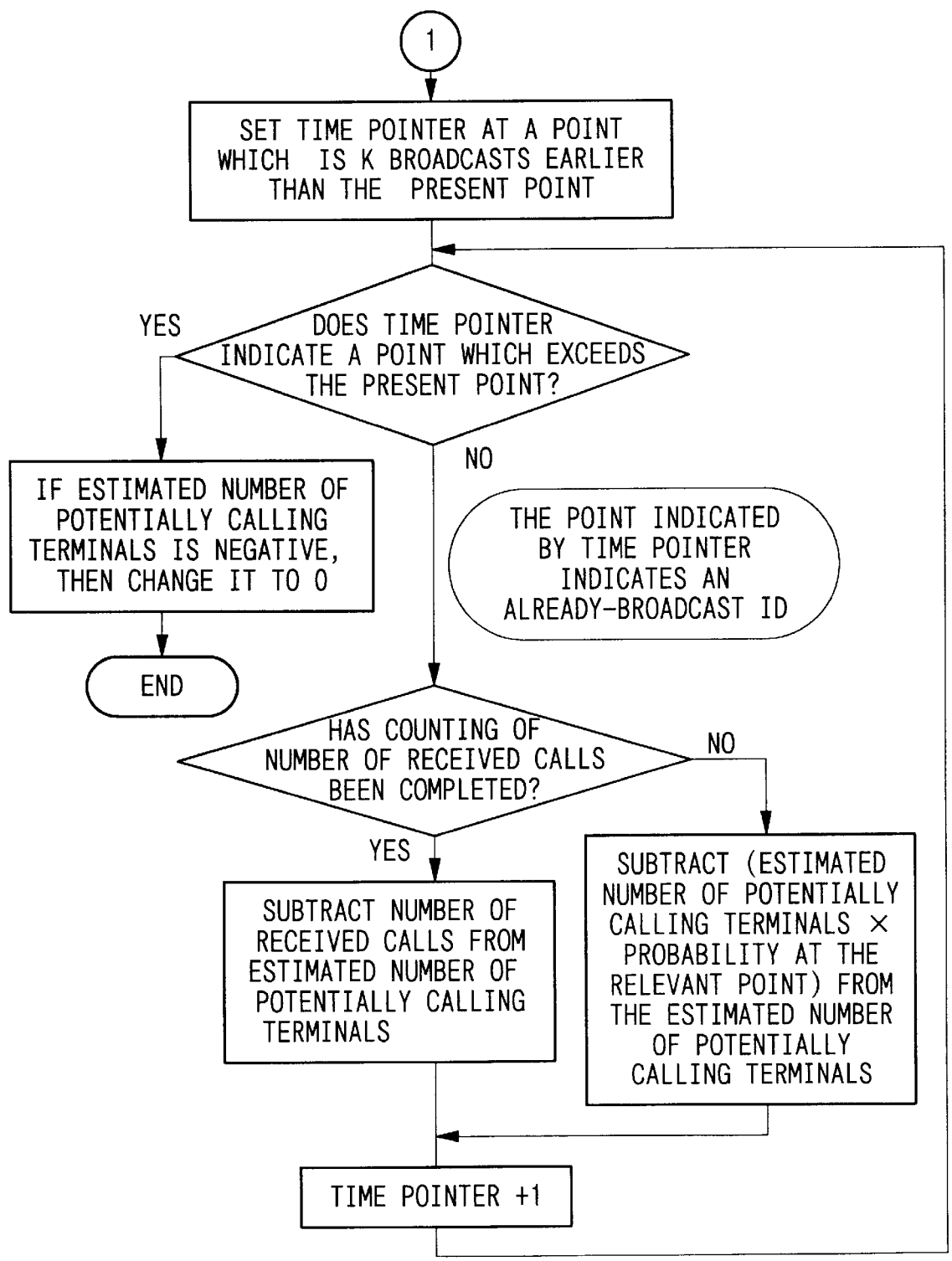
FIG. 10 is a flowchart showing amending operations with respect to the number of potentially calling terminals for IDs from the starting point to the present point.

The flowchart of FIG. 10 shows amending operations with respect to the IDs from the starting point to the present point. Here, "$\hat{1}$" in FIG. 10 indicates that the operations continue from the point "$\hat{1}$" in FIG. 9 to this point.

In addition, the operation of probability value calculating unit 160, in which the next call probability is calculated by using the call probabilities and each number of received calls with respect to recent IDs for which the number of received calls has already been counted, is essentially the same as working plural data collection systems periodically in turn, except for presence/absence of the amending operations.

Hereinbelow, shortening of the interval of the broadcast will be explained.

Figure 11A:
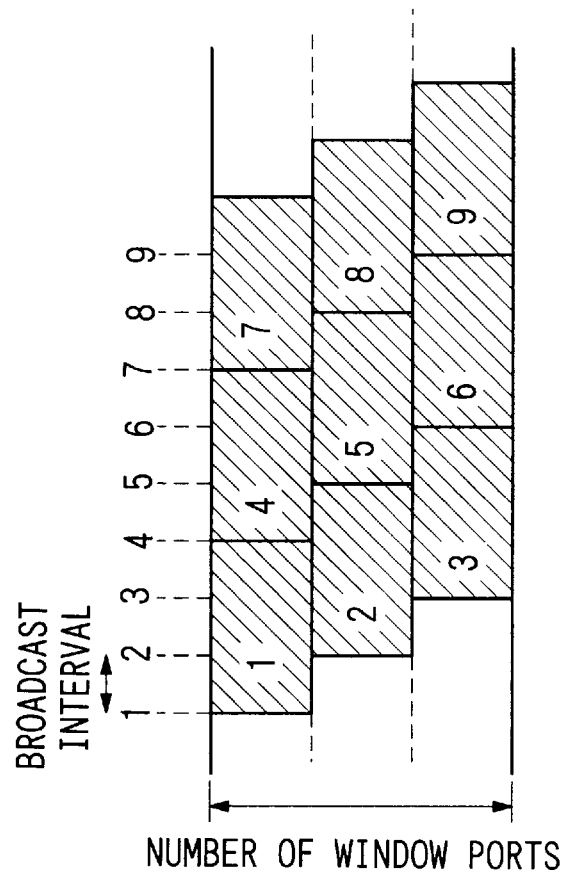
FIGS. 11A and 11B are diagrams for explaining a method of shortening the interval of the broadcast by dividing the center window into plural small windows, as an embodiment according to the present invention.
Figure 11B:
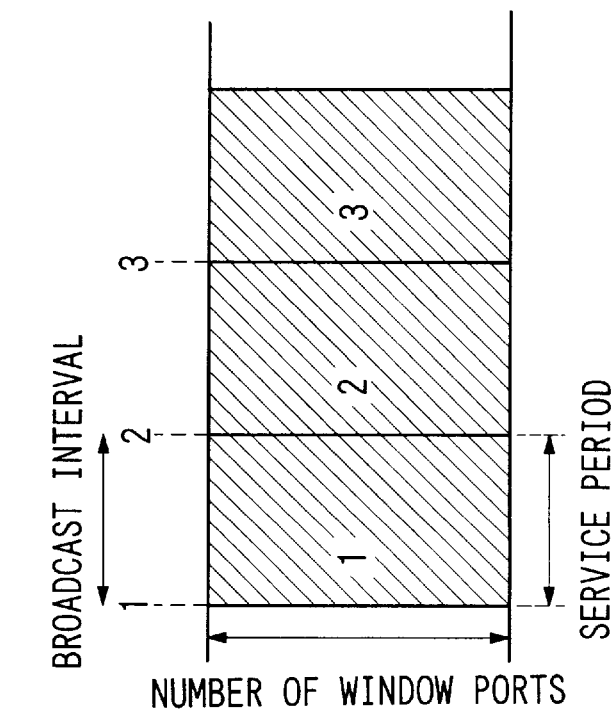

FIGS. 11A and 11B are diagrams for explaining a method of shortening the interval of the broadcast by dividing the center window into plural small windows, as an embodiment according to the present invention.

If the interval of the broadcast is shortened, the correspondence between the call probability and the number of received responsive calls can be detected with shorter intervals. Therefore, it is possible to promptly detect and follow temporal variation of the number of potentially calling terminals. Usually, the broadcast interval is defined as a service period from the time when each terminal calls up and is connected to center 100 to the time when the terminal is disconnected from the center, as shown in FIG. 11A. If the center window is divided into N groups of small windows (3 groups in FIG. 11B) and responsive calls for each ID are received via each small window in turn, then the broadcast interval can be shortened to 1/N thereof.

If different telephone numbers are assigned to each small window (though this case being different from the present embodiment), then overflow calls which were not received by the small window become lost calls which cannot be counted by the center.

Figure 12A:
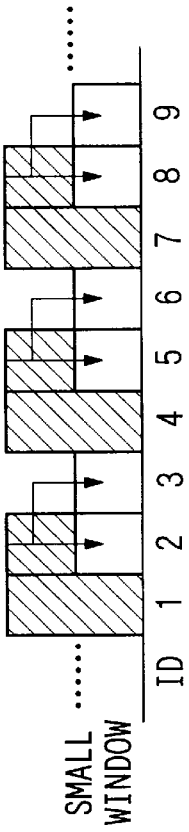
FIGS. 12A and 12B are diagrams for explaining a method of suitably detecting an overflow state of the small window by providing an excess portion of the number of received calls which overflowed a small window into the next small window.
Figure 12B:
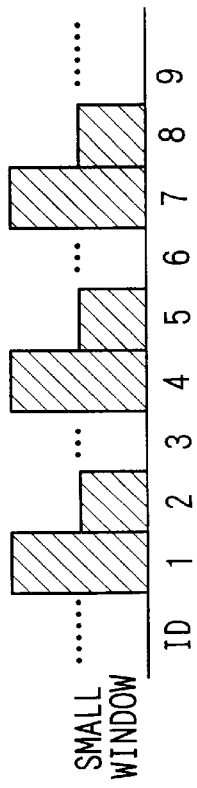

FIGS. 12A and 12B are diagrams for explaining a method of suitably detecting an overflow state of the small window by providing an excess portion (of the number of received calls) which overflowed a small window into the next small window.

When one main telephone number is assigned to a general window consisting of plural small windows, if the general window does not have an overflow state though there are some overflowed small windows, then the number of received calls for each ID can be estimated using "number of received calls/call probability". However, calls of an ID which overflowed a small window but did not overflow the general window occupy the general window during a service time and then block calls of the next ID. The calls which were blocked and lost cannot be counted by the center, of course. Accordingly, as in the case of IDs 1, 4, and 7 in FIG. 12A, if several times the number of expected calls are sent (2 times, in the case of FIG. 12A), the number of received calls may be zero (at ID=3, 6, or 9 in FIG. 12A) or may be smaller than the number of ports of the small window (at ID=2, 5, or 8 in FIG. 12A) though actually the small windows are continuously overflowed. That is, erroneous counting is performed. Unless it is recognized that the small windows are continuously overflowed, the call probability does not quickly decay.

In order to prevent such an undesired situation, when a number of received calls which overflow a small window is counted by the center, then it is effective to provide a number of excess calls into the next number of received calls (i.e., the number of received calls for the next ID) and to judge the overflow state relating to the small windows under this condition. Accordingly, as shown in FIG. 12B, a continuous overflow state of the small windows can surely be detected. If it is judged that no overflow occurs, then the number of potentially calling terminals at the time of broadcasting the relevant ID is estimated using the number of received calls of the ID, which includes no carried-over number of received calls relating to the previous ID.

Figure 13:
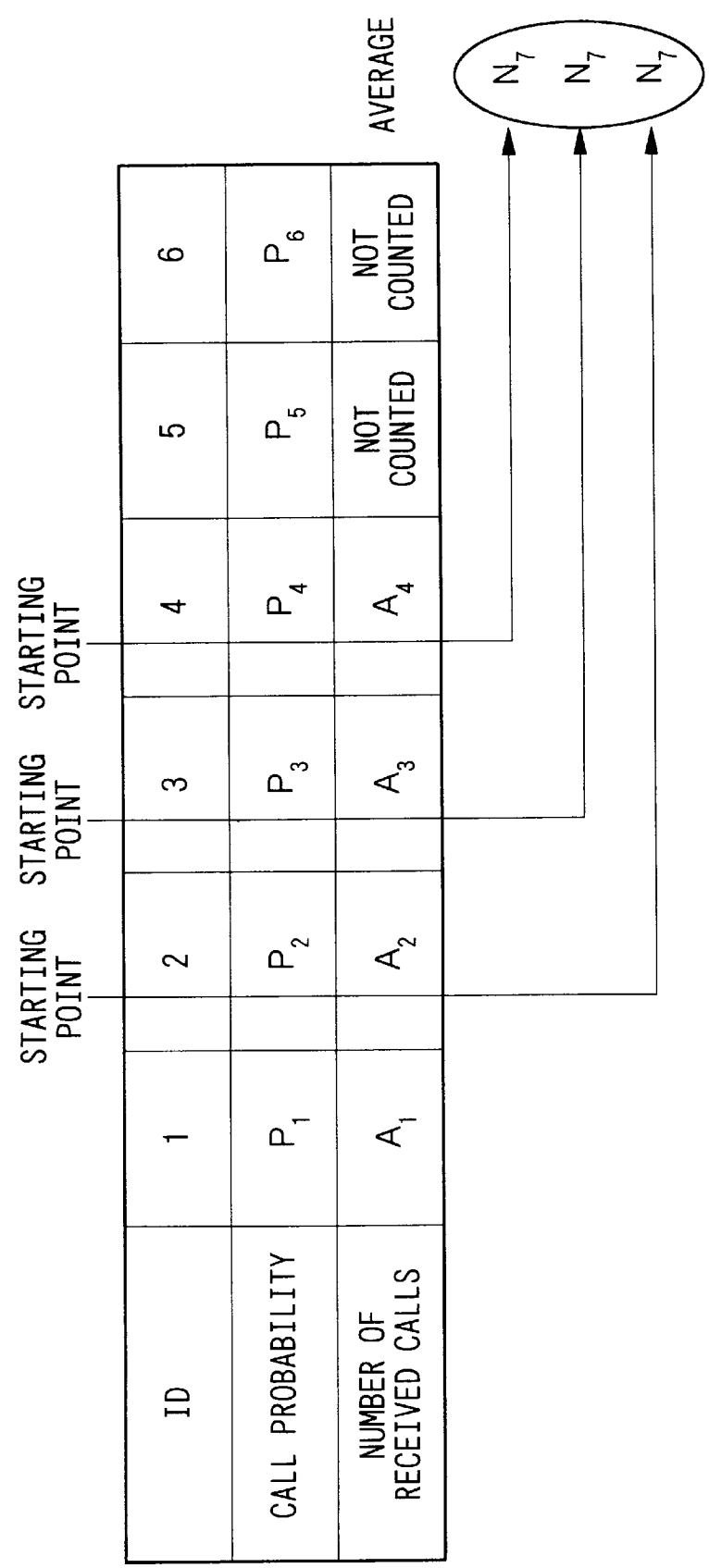
FIG. 13 is a diagram for explaining an averaging operation of the numbers of potentially calling terminals with respect to plural IDs as starting points.
Figure 14:
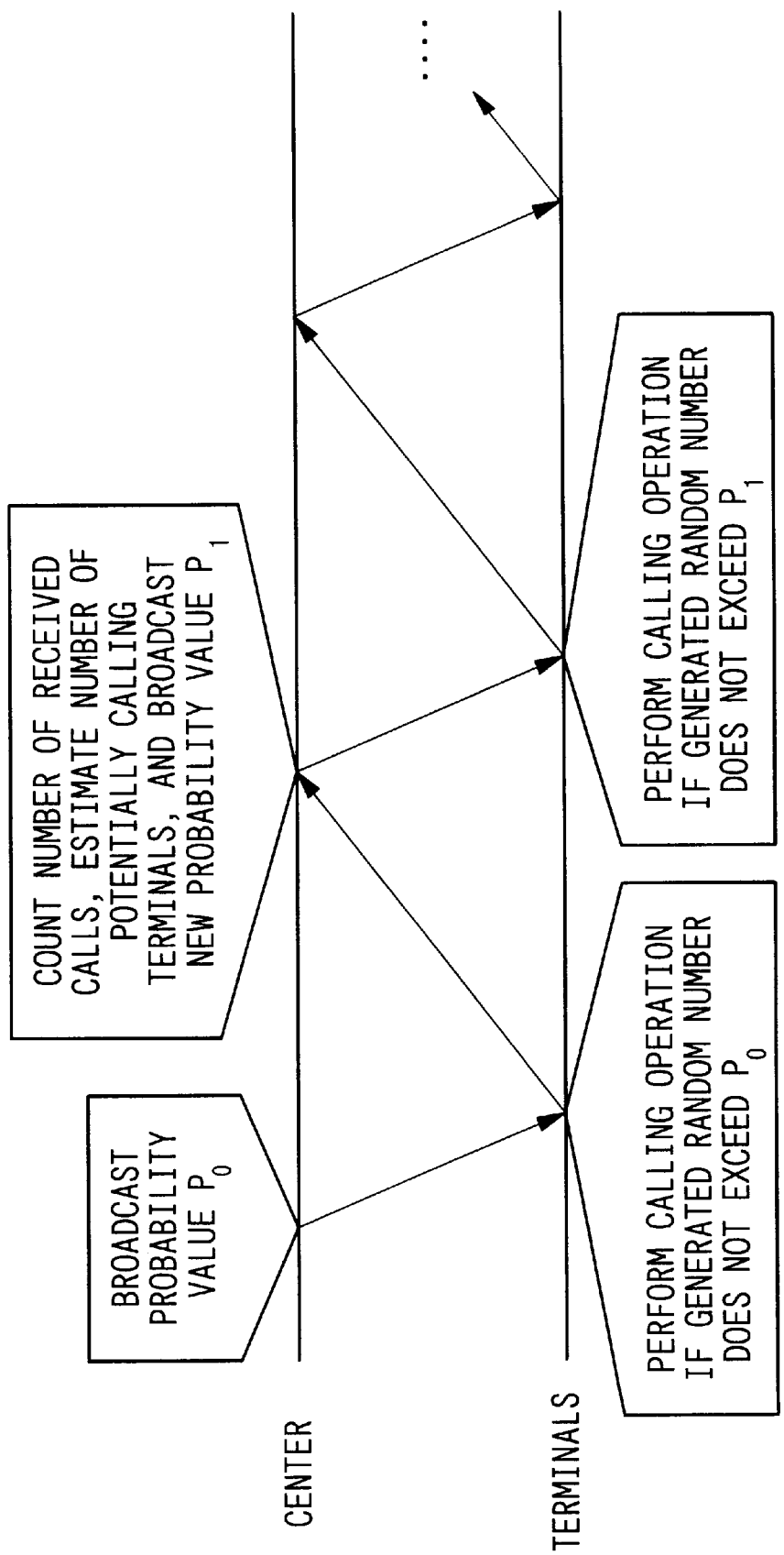
FIG. 14 is a diagram for explaining a conventional data collection method.
Figure 15:
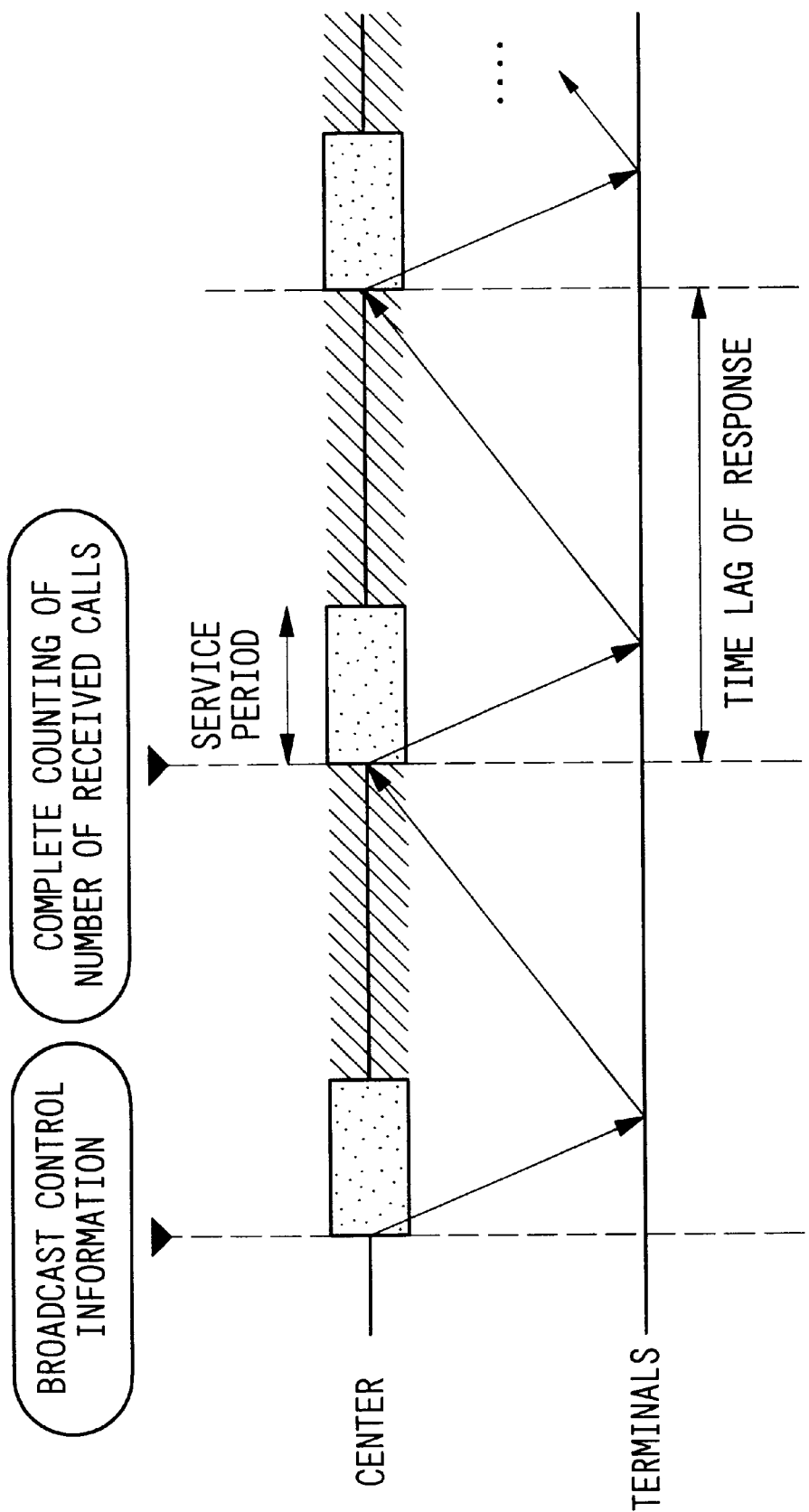
FIG. 15 is a diagram for explaining data collection according to the conventional method when a time lag is larger than a service period.

However, if windows become too small, an expected number of responsive calls for each ID becomes smaller, and then statistical dispersion becomes large. Therefore, it is effective that an average of a plurality of the estimated numbers of potentially calling terminals relating to plural recent IDs (as starting points) for which counting of the number of received calls has been completed be adopted as an end number of potentially calling terminals. That is, as shown in FIG. 13, the number of potentially calling terminals is calculated relating to each of plural IDs as starting points and then the average thereof is calculated, and thereby "$N_7$" (i.e., the number of potentially calling terminals at ID=7) is obtained. This operation corresponds to a calculation of a moving average for a recent fixed period. Accordingly, it is possible to suppress influence due to an incidental variation to the last, and to accurately grasp a tendency of a time-series variation.

Instead of using the average relating to recent IDs, an extensive interpolation method may be used. In this case, the present number of potentially calling terminals can be accurately estimated based on a tendency of variation of the past numbers of potentially calling terminals. Hereinbelow, an example will be explained, in which the extensive interpolation is performed using the estimated numbers N1 to Nk of potentially calling terminals, which were calculated with plural starting points of ID1 to IDk.

First, k points of (ID1, N1), (ID2, N2), . . . , (IDk, Nk) based on the above data are plotted on a two-dimensional coordinate plane. Then, coefficient a and constant b, by which a linear line "f=ax+b" most fits the above k points, are determined using the method of least squares.

Then, with the calculated a and b, the estimated number of terminals Nj relating to IDj to be broadcast next is calculated by the following equation.

$$Nj = a \cdot IDj + b$$

The extensive interpolation applied to a linear line (that is, a linear equation) was performed in this case. Similar interpolation can be performed using:
two dimensional curve (i.e., quadratic equation: $f=ax^2+bx+c$)
three dimensional curve (i.e., cubic equation: $f=ax^3+bx^2+cx+d$)

Therefore, when application to a polynominal using the estimated numbers of terminals relating to n IDs is performed, application to one to (n−1) dimensional equations is theoretically possible. However, one to three dimensional equations (i.e., linear to cubic equations) are sufficient in practice.

The above embodiment has been explained based on the structure of center 100 as shown in FIG. 3; however, the present invention is not limited to this embodiment. For example, counter 130 of the number of received calls, estimation unit 150 of the number of potentially calling terminals, and probability value calculating unit 160 may be established as software resources and these resources are stored into a disk device connected to the center, or into a portable storage medium such as a floppy disk or a CD-ROM so as to be properly installed for a general use.

The present invention is not limited to the above embodiments, and various variations and applications are possible within a scope of the claimed present invention.

Hereinbelow, comparison with known disclosed techniques relating to the contents of the present invention will be shown.

(1) U.S. Pat. No. 5,270,809 (Gammie, et al.)
"DATE RETURN FOR A TELEVISION TRANSMISSION SYSTEM"

A problem to be solved by this patent is the same as that of the present invention and a similar approach can be found in this patent. However, there are the following different points.

In the present invention, a control interval is defined and a call probability value is broadcast for each interval. However, in the above patent, a dispersive time duration is broadcast. In such a method of broadcasting the dispersive time duration, the interval for calling control is the same as the dispersive time duration; thus, control may become impossible for a long time. The method of the present invention realizes a periodical calling control and thus is advantageous.

The call probability (of the present invention) and the above-mentioned dispersive time duration are, so to speak, "cross" concepts and may be used together; thus, both features are quite different.

In the present invention, a concept of feedback based on estimation of the number of potentially calling terminals is introduced. Also from this point of view, both inventions are different.

(2) U.S. Pat. No. 5,479,492 (Hofstee, et al.)
"TELEVOTING METHOD AND SYSTEM"

This patent uses a random number generated at the terminal side so as to determine whether a calling operation is to be performed. This point resembles the present invention; however, the following points are different from the present invention.

In the method of the present invention, a call probability value, which is compared with a random number generated for determining whether a calling operation is to be performed, is communicated from the center (such as a TV station) to the viewer side by using broadcast-type information communicating means. In the above patent (Hofstee et al.), no mention about a method for determining such a criterion value is found and an efficient "feedback method based on estimation of the number of potentially calling terminals by using combination with a broadcast path", as a feature of the present invention, is not expected from the above patent.

(3) U.S. Pat. No. 4,931,941 (Krishnan)
"ADAPTIVE ROUTING OF NETWORK TRAFFIC"

In this patent, path control is performed based on measured traffic load inside the communication network. The present invention relates to the traffic control outside the network (that is, between the terminal ends), and both are clearly different (4) U.S. Pat. No. 5,081,680 (Bennett)
"INITIAL REPORTING OF REMOTELY GENERATED DATA"

This patent provides a method for accurately performing time synchronization between all terminals under a condition in which time slots for sending data from many terminals to the center device are previously determined with respect to each terminal device. The present invention relates to collection of data from a large number of unspecified terminals, to which conventional data collection techniques under a condition in which terminals are specified cannot be directly applied. Therefore, both are clearly different.

(5) U.S. Pat. No. 4,696,029 (Cohen)
"TELEPHONE TRAFFIC LOAD CONTROL SYSTEM"

This patent has a similar problem to be solved and similar approach to the present invention, but is different in the following points from the present invention.

In the present invention, preparation of response data from viewers (such as votes) and sending-back to the broadcasting station are performed by terminal devices controlled via the broadcast path. In this patent (Cohen), a viewer's action such as voting is influenced by controlling frequency of displaying an appeal message included in a TV picture, and thereby the traffic of the telephone network is controlled.

Accordingly, this patent does not disclose a function of improving the efficiency of operating equipment as much as possible by performing the feedback operation based on estimation of the number of potentially calling terminals, which is the most important concept of the present invention. Therefore, this patent clearly differs from the present invention.

(6) U.S. Pat. No. 5,295,183 (Langlois et al.) "CONGESTION CONTROL SYSTEM FOR TELECOMMUNICATIONS"

In this patent, congestion is prevented by performing a dynamic calling path control inside the communication network. The present invention relates to the traffic control outside the network (that is, between the terminal ends), and both are clearly different.

What is claimed is:

1. A data collection method for collecting at a center data stored in many terminals via a public network wherein:

the center periodically broadcasts a probability value as control information from the center to each terminal at a predetermined interval, and stores the broadcast probability value;

each terminal receives the probability value, determines whether a calling operation is to be performed in response to the present broadcast based on a probability which is set according to the probability value, and if the operation is to be performed, the terminal sends terminal data to the center;

the center receives a call from the terminal which performed the calling operation, receives the terminal data corresponding to the call, counts the number of received calls for each broadcast control information based on the predetermined interval, and stores the counted number of received calls; and the center estimates the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used, and the center calculates and broadcasts a probability value to be broadcast next based on the estimated number of potentially calling terminals, wherein the predetermined interval of the broadcast of the probability value is set to be shorter than a period from the time of broadcasting the probability value to the time of receiving response calls from the terminals with respect to the relevant probability value.

2. A data collection method as claimed in claim 1, wherein:

as the control information periodically broadcast from the center to each terminal, an ID number is also broadcast as a serial number which corresponds to the control information for each broadcast, and the probability value and the corresponding ID number are stored in the center in a correspondence relationship;

each terminal receives the probability value and the ID number, and if the calling operation is performed, the terminal also sends the received ID number with the terminal data;

the center counts the number of received calls for each ID number and stores the counted number of received calls in a correspondence relationship with the relevant ID after the counting; and the center estimates the number of potentially calling terminals at the present time by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used.

3. A data collection method as claimed in claim 2, wherein as a method of estimating the number of potentially calling terminals at the present time:

regarding an ID number for which the counting of the number of received calls has been completed and which was broadcast k broadcasts earlier than the present ID number, the number of potentially calling terminals at the time of broadcasting the relevant ID number is estimated based on the probability value and the number of received calls of the ID number, and regarding this ID number and the following ID numbers for which the counting of the number of received calls has been completed, the number of received calls for a target ID is subtracted from the estimated number of potentially calling terminals of this ID, and thereby the number of potentially calling terminals at the time of broadcasting the next ID is estimated; and regarding further following ID numbers for which the counting of the number of received calls has not yet been completed, the number of received calls is estimated using the broadcast probability value corresponding to a target ID and the estimated number of potentially calling terminals at the time of broadcasting the probability value, and the number of potentially calling terminals at the time of broadcasting the next ID number is calculated by subtracting the estimated number of received calls from the estimated number of potentially calling terminals for the target ID, and thereby the number of potentially calling terminals at the present time is estimated using an ID number as a starting point for which the counting of the number of received calls has been completed and which was broadcast k broadcasts earlier than the present ID number.

4. A data collection method as claimed in claim 2, wherein as a method of estimating the number of potentially calling terminals at the present time:

regarding a target ID number which was broadcast k broadcasts earlier than the present ID number, if the counted number of received calls equals or exceeds the number of possible window ports of the center for accepting calls and thus an overflow occurs;

then the number of continuous overflow broadcasts in which the window ports similarly overflowed is counted by going further back from the target ID number; and the larger the number of continuous overflow broadcasts, the larger the number of potentially calling terminals at the time of broadcasting the ID number which was broadcast k broadcasts earlier than the present ID number is estimated.

5. A data collection method as claimed in claim 4, wherein:

regarding a target ID number which was broadcast k broadcasts earlier than the present ID number, if the counted number of received calls equals or exceeds the number of possible window ports of the center for accepting calls and thus an overflow occurs, then the number of continuous overflow broadcasts in which the window ports similarly overflowed is counted by going further back from the target ID number;

the most recent ID number without such overflow is detected in the above going-back operation, and the number of potentially calling terminals at the time of broadcasting the detected ID number is estimated based on the probability value and the counted number of received calls with respect to the detected ID number;

if the estimated number of potentially calling terminals is larger than zero, then the estimated number of potentially calling terminals is multiplied by a constant which is larger than 1, repeatedly by a number of times which corresponds to the number of continuous overflow broadcasts, and the product is determined as the estimated number of potentially calling terminals at the time of broadcasting the ID number which was broadcast k broadcasts earlier than the present ID number; and while if the estimated number of potentially calling terminals is zero, then a value obtaining by dividing the number of window ports by the probability value with respect to the smallest ID number of the overflow state is multiplied by a constant which is larger than 1, repeatedly by a number of times which corresponds to the number of continuous overflow broadcasts, and the product is determined as the estimated number of potentially calling terminals at the time of broadcasting the ID number which was broadcast k broadcasts earlier than the present ID number.

6. A data collection method as claimed in claim 3, wherein:

as a method of estimating the number of potentially calling terminals at the present time, regarding plural ID numbers for which counting of the number of received calls has been completed, the number of potentially calling terminals at the present time is calculated for each ID number as a starting point, and an average of calculated results is determined as the estimated number of potentially calling terminals at the present time.

7. A data collection method as claimed in claim 4, wherein:

as a method of estimating the number of potentially calling terminals at the present time, regarding plural ID numbers for which counting of the number of received calls has been completed, the number of potentially calling terminals at the present time is calculated for each ID number as a starting point, and an average of calculated results is determined as the estimated number of potentially calling terminals at the present time.

8. A data collection method as claimed in claim 3, wherein:

as a method of estimating the number of potentially calling terminals at the present time, regarding plural ID numbers for which counting of the number of received calls has been completed, the number of potentially calling terminals at the present time is calculated for each ID number as a starting point, and the estimated number of potentially calling terminals at the present time is determined by performing an extensive interpolation with respect to the above calculated numbers of potentially calling terminals.

9. A data collection method as claimed in claim 4, wherein:

as a method of estimating the number of potentially calling terminals at the present time, regarding plural ID numbers for which counting of the number of received calls has been completed, the number of potentially calling terminals at the present time is calculated for each ID number as a starting point, and the estimated number of potentially calling terminals at the present time is determined by performing an extensive interpolation with respect to the above calculated numbers of potentially calling terminals.

10. A data collection method as claimed in claim 2, wherein window ports of the center for accepting calls are divided into plural small windows, and calls relating to each ID are received by each small window in turn.

11. A data collection method as claimed in claim 10, wherein:

if the number of received calls relating to an ID number exceeds the number of possible ports of a relevant small window for accepting calls, then an excess portion is carried over to the number of received calls relating to the next small window; and if the sum of the number of these carried-over received calls and the above number of received calls relating to the next small window exceeds the number of possible ports of a relevant small window for accepting calls, then it is also judged for this next ID that the small window has been filled up with calls and an excess portion of this time is further carried over to the number of received calls relating to the subsequent ID.

12. A data collection method as claimed in claim 2, wherein based on information on a temporal dispersive distribution of responsive calls from plural terminals relating to an ID number, the number of received calls for the ID is estimated before all calls relating to this ID have been received and this estimated number is determined as the end number of received calls for the ID.

13. A data collection system for collecting at a center data stored in many terminals via a public network wherein the apparatus of the center comprises:

broadcasting means for periodically broadcasting a probability value as control information from the center to each terminal at a predetermined interval;

probability value storing means for storing the broadcast probability value;

receiving means for receiving a call from the terminal which performed the calling operation and also receiving the terminal data corresponding to the call;

counting means for counting the number of received calls for each broadcast control information based on the predetermined interval;

counted number storing means for storing the counted number of received calls;

estimation means for estimating the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used; and calculating means for calculating a probability value to be broadcast next based on the estimated number of potentially calling terminals, and each device of the terminal side comprises:

receiving means for receiving the probability value broadcast from the center;

calling determining means for determining whether a calling operation is to be performed in response to the present broadcast based on a probability which is set according to the probability value; and calling means for sending terminal data to the center if the operation is to be performed, and wherein the predetermined interval of the broadcast of the probability value is set to be shorter than a period from the time of broadcasting the probability value to the time of receiving response calls from the terminals with respect to the relevant probability value.

14. A data collection system as claimed in claim 13, wherein in the apparatus of the center:

the broadcasting means also broadcasts an ID number as a serial number which corresponds to the control information for each broadcast;

the probability value storing means stores the probability value and the corresponding ID number in a correspondence relationship;

the counting means counts the number of received calls for each ID number;

the counted number storing means stores the counted number of received calls in a correspondence relationship with the relevant ID; and the estimation means estimates the number of potentially calling terminals at the present time by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used, and in the device of the terminal:

the receiving means receives the probability value and the ID number broadcast from the center; and the calling means also sends the received ID number with the terminal data if the calling operation is performed.

15. A data collection system as claimed in claim 14, wherein the estimation means includes present situation estimating means which comprises:

means for estimating the number of potentially calling terminals at the time of broadcasting an ID number for which the counting of the number of received calls has been completed and which was broadcast k broadcasts earlier than the present ID number, based on the probability value and the number of received calls of the ID number, first broadcast situation estimating means by which regarding the above ID number and the following ID numbers for which the counting of the number of received calls has been completed, the number of received calls for a target ID is subtracted from the estimated number of potentially calling terminals of this ID, and thereby the number of potentially calling terminals at the time of broadcasting the next ID is estimated; and second broadcast situation estimating means by which regarding further following ID numbers for which the counting of the number of received calls has not yet been completed, the number of received calls is estimated using the broadcast probability value corresponding a target ID and the estimated number of potentially calling terminals at the time of broadcasting the probability value, and the number of potentially calling terminals at the time of broadcasting the next ID number is calculated by subtracting the estimated number of received calls from the estimated number of potentially calling terminals for the target ID, and thereby the present situation estimating means estimates the number of potentially calling terminals at the present time by using an ID number as a starting point for which the counting of the number of received calls has been completed and which was broadcast k broadcasts earlier than the present ID number.

16. A data collection system as claimed in claim 14, wherein in the estimation means:

regarding a target ID number which was broadcast k broadcasts earlier than the present ID number, if the counted number of received calls equals or exceeds the number of possible window ports of the center for accepting calls and thus an overflow occurs;

then the number of continuous overflow broadcasts in which the window ports similarly overflowed is counted by going further back from the target ID number; and the larger the number of continuous overflow broadcasts, the larger the number of potentially calling terminals at the time of broadcasting the ID number which was broadcast k broadcasts earlier than the present ID number is estimated.

17. A data collection system as claimed in claim 16, wherein the estimation means comprises:

overflow number counting means by which regarding a target ID number which was broadcast k broadcasts earlier than the present ID number, if the counted number of received calls equals or exceeds the number of possible window ports of the center for accepting calls and thus an overflow occurs, then the number of continuous overflow broadcasts in which the window ports similarly overflowed is counted by going further back from the target ID number;

number of terminals calculating means for detecting the most recent ID number without such overflow in the above going-back operation, and for estimating the number of potentially calling terminals at the time of broadcasting the detected ID number based on the probability value and the counted number of received calls with respect to the detected ID number;

first estimated number calculating means by which if the estimated number of potentially calling terminals is larger than zero, then the estimated number of potentially calling terminals is multiplied by a constant which is larger than 1, repeatedly by a number of times which corresponds to the number of continuous overflow broadcasts, and the product is determined as the estimated number of potentially calling terminals at the time of broadcasting the ID number which was broadcast k broadcasts earlier than the present ID number; and second estimated number calculating means by which if the estimated number of potentially calling terminals is zero, then a value obtaining by dividing the number of window ports by the probability value with respect to the smallest ID number of the overflow state is multiplied by a constant which is larger than 1, repeatedly by a number of times which corresponds to the number of continuous overflow broadcasts, and the product is determined as the estimated number of potentially calling terminals at the time of broadcasting the ID number which was broadcast k broadcasts earlier than the present ID number.

18. A data collection system as claimed in claim 15, wherein the estimation means includes first estimated number of terminals calculating means by which regarding plural ID numbers for which counting of the number of received calls has been completed, the number of potentially calling terminals at the present time is calculated for each ID number as a starting point, and an average of calculated results is determined as the estimated number of potentially calling terminals at the present time.

19. A data collection system as claimed in claim 16, wherein the estimation means includes first estimated number of terminals calculating means by which regarding plural ID numbers for which counting of the number of received calls has been completed, the number of potentially calling terminals at the present time is calculated for each ID number as a starting point, and an average of calculated results is determined as the estimated number of potentially calling terminals at the present time.

20. A data collection system as claimed in claim 15, wherein the estimation means includes second estimated number of terminals calculating means by which regarding plural ID numbers for which counting of the number of received calls has been completed, the number of potentially calling terminals at the present time is calculated for each ID number as a starting point, and the estimated number of potentially calling terminals at the present time is determined by performing an extensive interpolation with respect to the above calculated numbers of potentially calling terminals.

21. A data collection system as claimed in claim 16, wherein the estimation means includes second estimated number of terminals calculating means by which regarding plural ID numbers for which counting of the number of received calls has been completed, the number of potentially calling terminals at the present time is calculated for each ID number as a starting point, and the estimated number of potentially calling terminals at the present time is determined by performing an extensive interpolation with respect to the above calculated numbers of potentially calling terminals.

22. A data collection system as claimed in claim 14, further comprising window dividing means for dividing window ports of the center for accepting calls into plural small windows so as to receive calls relating to each ID by each small window in turn.

23. A data collection system as claimed in claim 22, wherein the window dividing means includes carrying over means by which:
   if the number of received calls relating to an ID number exceeds the number of possible ports of a relevant small window for accepting calls, then an excess portion is carried over to the number of received calls relating to the next small window; and
   if the sum of the number of these carried-over received calls and the above number of received calls relating to the next small window exceeds the number of possible ports of a relevant small window for accepting calls, then it is also judged for this next ID that the small window has been filled up with calls and an excess portion of this time is further carried over to the number of received calls relating to the subsequent ID.

24. A data collection system as claimed in claim 14, further comprising end number of received calls determining means by which based on information on a temporal dispersive distribution of responsive calls from plural terminals relating to an ID number, the number of received calls for the ID is estimated before all calls relating to this ID have been received and this estimated number is determined as the end number of received calls for the ID.

25. A center apparatus in a data collection system for collecting at a center data stored in many terminals via a public network, the apparatus comprising:
   broadcasting means for periodically broadcasting a probability value as control information from the center to each terminal at a predetermined interval;
   probability value storing means for storing the broadcast probability value;
   receiving means for receiving a call from the terminal which performed the calling operation and also receiving the terminal data corresponding to the call;
   counting means for counting the number of received calls for each broadcast control information based on the predetermined interval;
   counted number storing means for storing the counted number of received calls;
   estimation means for estimating the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used; and
   calculating means for calculating a probability value to be broadcast next based on the estimated number of potentially calling terminals, and
   wherein the predetermined interval of the broadcast of the probability value is set to be shorter than a period from the time of broadcasting the probability value to the time of receiving response calls from the terminals with respect to the relevant probability value.

26. A center apparatus as claimed in claim 25, wherein:
   the broadcasting means also broadcasts an ID number as a serial number which corresponds to the control information for each broadcast;
   the probability value storing means stores the probability value and the corresponding ID number in a correspondence relationship;
   the counting means counts the number of received calls for each ID number;
   the counted number storing means stores the counted number of received calls in a correspondence relationship with the relevant ID; and
   the estimation means estimates the number of potentially calling terminals at the present time by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used.

27. A computer readable storage medium for a center apparatus, which stores a data collecting program for efficiently collecting at a center data, which are stored in many terminals registered in the center apparatus, via a public network, the program comprising:

a broadcasting process for periodically broadcasting a probability value as control information from the center to each terminal at a predetermined interval;

a probability value storing process for storing the broadcast probability value;

a receiving process for receiving a call from the terminal which performed the calling operation and also receiving the terminal data corresponding to the call;

a counting process for counting the number of received calls for each broadcast control information based on the predetermined interval;

a counted number storing process for storing the counted number of received calls;

a estimation process for estimating the number of potentially calling terminals at the present time by using at least a portion of the information relating to each broadcast in a manner such that regarding a broadcast for which counting of the number of received calls has been completed, the broadcast probability value and the counted number of received calls are used while regarding a broadcast for which counting of the number of received calls has not yet been completed, the broadcast probability value is used; and a calculating process for calculating a probability value to be broadcast next based on the estimated number of potentially calling terminals, and wherein in the broadcasting process, the predetermined interval of the broadcast of the probability value is set to be shorter than a period from the time of broadcasting the probability value to the time of receiving response calls from the terminals with respect to the relevant probability value.

28. A storage medium as claimed in claim 27, wherein in the stored data collection program:

in the broadcasting process, an ID number is also broadcast as a serial number which corresponds to the control information for each broadcast;

in the probability value storing process, the probability value and the corresponding ID number are stored in a correspondence relationship;

in the counting process, the number of received calls is counted for each ID number;

in the counted number storing process, the counted number of received calls is stored in a correspondence relationship with the relevant ID; and in the estimation process, the number of potentially calling terminals at the present time is estimated by using at least a portion of the information relating to each ID number in a manner such that regarding an ID number for which counting of the number of received calls has been completed, the broadcast probability value and the counted number of received calls are used while regarding an ID number for which counting of the number of received calls has not yet been completed, the broadcast probability value is used.

* * * * *